United States Patent
Burlatsky et al.

(10) Patent No.: US 10,254,730 B2
(45) Date of Patent: *Apr. 9, 2019

(54) SYSTEM AND PROCESS FOR EVALUATING AND VALIDATING ADDITIVE MANUFACTURING OPERATIONS

(71) Applicant: United Technologies Corporation, Farmington, CT (US)

(72) Inventors: Sergei F. Burlatsky, West Hartford, CT (US); Dmitri Novikov, Avon, CT (US); William J. Brindley, Hebron, CT (US); David Ulrich Furrer, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/441,620

(22) Filed: Feb. 24, 2017

(65) Prior Publication Data
US 2017/0291366 A1 Oct. 12, 2017

Related U.S. Application Data

(60) Provisional application No. 62/321,328, filed on Apr. 12, 2016.

(51) Int. Cl.
*B33Y 10/00* (2015.01)
*B33Y 30/00* (2015.01)
(Continued)

(52) U.S. Cl.
CPC ........ *G05B 19/0426* (2013.01); *B29C 64/153* (2017.08); *B29C 64/393* (2017.08);
(Continued)

(58) Field of Classification Search
CPC ...... G05B 19/0426; G05B 2219/49023; G06F 17/5086; G06F 2217/12; B29C 64/153;
(Continued)

(56) References Cited

U.S. PATENT DOCUMENTS 6,813,533 B1 11/2004 Semak
9,044,827 B2 6/2015 Song et al.
(Continued)

OTHER PUBLICATIONS

Kamath, Chandrika, Data mining and statistical inference in selective laser melting, International Journal of Advanced Manufacturing Technology, Springer Verlag, London, GB, Jan. 11, 2016, pp. 1659-1677.

(Continued)

*Primary Examiner* — Michael J Brown
(74) *Attorney, Agent, or Firm* — Carlson, Gaskey & Olds, P.C.

(57) ABSTRACT

A method of evaluating and validating additive manufacturing operations includes generating a multidimensional space defined by a plurality of bounds, each of the bounds being defined on a distinct parameter of an additive manufacturing process and each of the parameters being directly related to the occurrence of a horizontal lack of fusion flaw, each of the parameters being a dimension in a multi-dimensional coordinate system, determining a coordinate position of at least one additive manufacturing operation within the multi-dimensional coordinate system, and categorizing the operation as free of horizontal lack of fusion flaws when the coordinate position is within the multi-dimensional space.

18 Claims, 3 Drawing Sheets

(51) Int. Cl.
*B33Y 50/02* (2015.01)
*G05B 19/042* (2006.01)
*G06F 17/50* (2006.01)
*B29C 64/153* (2017.01)
*B29C 64/393* (2017.01)
*B22F 3/105* (2006.01)

(52) U.S. Cl.
CPC ........ *G06F 17/5086* (2013.01); *B22F 3/1055* (2013.01); *B22F 2003/1056* (2013.01); *B33Y 10/00* (2014.12); *B33Y 30/00* (2014.12); *B33Y 50/02* (2014.12); *G05B 2219/49023* (2013.01); *G06F 2217/12* (2013.01); *Y02P 10/295* (2015.11); *Y02P 90/265* (2015.11)

(58) Field of Classification Search
CPC ....... B29C 64/393; B33Y 10/00; B33Y 30/00; B33Y 50/02; B22F 2003/1056; B22F 3/1055
USPC ..................................................... 700/96, 98
See application file for complete search history.

(56) References Cited

U.S. PATENT DOCUMENTS

| 9,471,046 | B2 | 10/2016 | Tertel et al. |
| 9,724,876 | B2 * | 8/2017 | Cheverton ............ B29C 64/386 |
| 2008/0223832 | A1 | 9/2008 | Song et al. |
| 2008/0296270 | A1 | 12/2008 | Song et al. |
| 2014/0249773 | A1 | 9/2014 | Beuth, Jr. |
| 2016/0059352 | A1 | 3/2016 | Sparks |
| 2016/0184893 | A1 | 6/2016 | Vivek et al. |

OTHER PUBLICATIONS

Vlasea, M. L, et al., Development of Powder Bed Fusion Additive Manufacturing Test Bed for Enhanced Real-time Process Control, Dec. 31, 2015, retrieved from the Internet on Oct. 19, 2016 at URL:http://sffsymposium.engr.utexas.edu/sites/default/files/2015/2015-42-Vlasea.pdf.

European Search Report for Application No. 17165933.7 dated Aug. 16, 2017.

Sames, W.J., et al., The metallurgy and processing of science of metal additive manufacturing, International Materials Reviews, vol. 61, No. 5, Mar. 7, 2016, pp. 315-360.

European Search Report for Application No. 17166007.9 dated Aug. 29, 2017.

European Search Report for Application No. 17166097.0 dated Aug. 29, 2017.

European Search Report for Application No. 17165920.4 dated Aug. 11, 2017.

European Search Report for Application No. 17165936.0 dated Aug. 16, 2017.

European Search Report for Application No. 17166028.5 dated Aug. 29, 2017.

* cited by examiner

SYSTEM AND PROCESS FOR EVALUATING AND VALIDATING ADDITIVE MANUFACTURING OPERATIONS

CROSS-REFERENCE TO RELATED APPLICATION

This application claims priority to U.S. Patent Application No. 62/321,328, which was filed on Apr. 12, 2016.

TECHNICAL FIELD

The present disclosure relates generally to additive manufacturing, and more specifically to a process for evaluating and validating additive manufacturing operation sequences.

BACKGROUND

Additive manufacturing is a process that is utilized to create components by applying sequential material layers, with each layer being applied to the previous material layer. As a result of the iterative, trial and error, construction process, multiple different parameters affect whether an end product created using the additive manufacturing process includes flaws, or is within acceptable tolerances of a given part. Typically, components created using an additive manufacturing process are designed iteratively, by adjusting one or more parameters each iteration and examining the results to determine if the results have the required quality.

In some components, such as aircraft components, or other components with low tolerances, a substantial number of iterations can be required before determining a set of parameters that results in a component with an acceptable quality level. This iterative process can require months or years in order to refine a single part.

SUMMARY OF THE INVENTION

An exemplary method of evaluating and validating additive manufacturing operations includes generating a multi-dimensional space defined by a plurality of bounds, each of the bounds being defined on a distinct parameter of an additive manufacturing process and each of the parameters being directly related to the occurrence of a horizontal lack of fusion flaw, each of the parameters being a dimension in a multi-dimensional coordinate system, determining a coordinate position of at least one additive manufacturing operation within the multi-dimensional coordinate system, and categorizing the operation as free of horizontal lack of fusion flaws when the coordinate position is within the multi-dimensional space.

In another example of the above described exemplary method of evaluating and validating manufacturing operation an operation that is free of horizontal lack of fusion flaws is an additive manufacturing operation where horizontal lack of fusion flaws in a resultant work piece are below an acceptable threshold.

In another example of any of the above described exemplary methods of evaluating and validating manufacturing operation the parameters include a beam power, a beam velocity, a local part temperature, a powder bed thickness, and a powder particle size, and wherein each of the bounds is defined by at least one mathematical function.

In another example of any of the above described exemplary methods of evaluating and validating manufacturing operation each of the parameters is normalized to each other of the parameters.

In another example of any of the above described exemplary methods of evaluating and validating manufacturing operation at least one of the mathematical functions is a least partially empirically determined.

In another example of any of the above described exemplary methods of evaluating and validating manufacturing operation at least one of the mathematical functions is determined via simulation.

Another example of any of the above described exemplary methods of evaluating and validating manufacturing operation further includes creating a work piece by causing an additive manufacturing machine to perform the at least one additive manufacturing operation in response to categorizing the at least one additive manufacturing operation as free of horizontal lack of fusion flaws.

In another example of any of the above described exemplary methods of evaluating and validating manufacturing operation at least one of the parameters is partially unbounded.

In another example of any of the above described exemplary methods of evaluating and validating manufacturing operation at least one of the parameters is fully bounded.

In another example of any of the above described exemplary methods of evaluating and validating manufacturing operation the at least one additive manufacturing operation is a sequence of additive manufacturing operations.

In another example of any of the above described exemplary methods of evaluating and validating manufacturing operation the sequence of additive manufacturing operations is an ordered list of all operations required to create a part.

In another example of any of the above described exemplary methods of evaluating and validating manufacturing operation generating a multidimensional space defined by a plurality of bounds comprises generating multiple multidimensional spaces defined by a plurality of bounds, each of the multiple multidimensional spaces corresponding to one or more flaws and at least one of the multidimensional spaces corresponding to the horizontal lack of fusion flaw.

In one exemplary embodiment an additive manufacturing apparatus includes a chamber, a platform within the chamber, and a controller, the controlling including a processor and a memory, the memory storing instructions for causing the processor to validate at least one input operation as generating a workpiece free of horizontal lack of fusion flaws by determining a multi-dimensional coordinate in response to receiving the at least one input operation, and comparing the multi-dimensional coordinate to a stored multi-dimensional space, the stored multi-dimensional space being defined by a plurality of parameters including a beam power, a beam velocity, a local part temperature, a powder bed thickness, and a powder particle size.

In another example of the above described additive manufacturing apparatus the chamber further includes a powder bed fusion apparatus.

In another example of any of the above described additive manufacturing apparatus the powder bed fusion apparatus is a laser powder bed fusion apparatus.

In another example of any of the above described additive manufacturing apparatus the powder bed fusion apparatus is an electron beam powder bed fusion apparatus.

In another example of any of the above described additive manufacturing apparatus the memory further stores instructions for rejecting the at least one input operation in response to the determined multi-dimensional coordinate falling outside the multi-dimensional space.

In another example of any of the above described additive manufacturing apparatus the multi-dimensional space is a space having four or more dimensions, and wherein each of the dimensions includes at least one bound corresponding to an operational parameter of an additive manufacturing process.

These and other features of the present invention can be best understood from the following specification and drawings, the following of which is a brief description.

DETAILED DESCRIPTION OF AN EMBODIMENT

Figure 1:
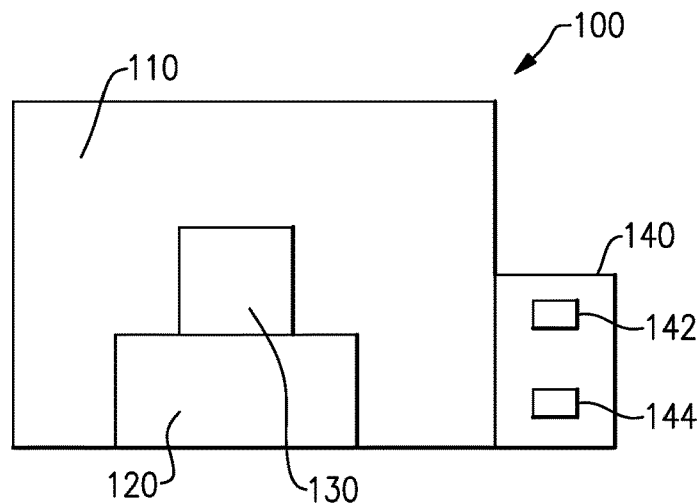
FIG. 1 schematically illustrates an exemplary additive manufacturing machine.

FIG. 1 schematically illustrates an additive manufacturing machine 100, such as a laser powder bed fusion additive manufacturing machine. In alternate examples, the powder bed fusion machine can be an electron beam powder bed fusion machine. The exemplary additive manufacturing machine 100 includes a manufacturing chamber 110 with a platform 120 upon which a part 130 (alternatively referred to as a work piece) is additively manufactured. A controller 140 is connected to the chamber 110 and controls the additive manufacturing process according to any known additive manufacturing control system.

Included within the controller 140 is a processor 142 that receives and interprets input operations to define a sequence of the additive manufacturing. As utilized herein "operations" refers to instructions specifying operational conditions for one or more step in an additive manufacturing process. The controller 140 can, in some examples, include user interface devices such as a keyboard and view screen. In alternative examples, the controller 140 can include a wireless or wired communication apparatus for communicating with a remote user input device such as a PC.

Also included in the controller 140 is a memory 144. In some examples, the controller 140 receives a desired additive manufacturing operation, or sequence of operations, and evaluates the entered operation(s) to determine if the resultant part 130 will be free of flaws. For the purposes of the instant disclosure, free of flaws, or flaw free, refers to a part 130 or workpiece with no flaws causing the part or workpiece to fall outside of predefined tolerances. By way of example, the predefined tolerances can include an amount of unmelt, a surface roughness, or any other measurable parameter of the part 130. The processor 142 determines a set of parameters, based on the input operation(s) using a set of equations stored within the memory 144. Each of the equations is configured to determine a specific output parameter, based on two or more variables of the input operation(s). By way of example, factors impacting the output parameters can include material properties, environmental conditions, or any other factors. While described and illustrated herein as a component of a laser powder bed fusion additive manufacturing machine, the software configuration and operations can, in some examples, be embodied as a distinct software program independent of the additive manufacturing machine, or included within any other type of additive manufacturing machine.

The output parameters are combined to define a coordinate of the operation(s) on a multi-dimensional coordinate system. The multi-dimensional coordinate system is a coordinate system having more than three dimensions. The processor 142 then compares the determined coordinate (the combined output parameter) against a multi-dimensional space defined in the multi-dimensional coordinate system, and stored in the memory 144. The multi-dimensional space is formed from one or more bounds within each dimension. If the coordinate falls within the multi-dimensional space, the processor 142 determines that the input operation(s) is flaw free. If the coordinate falls outside of the multi-dimensional space, the processor 142 determines that the input operation(s) will result in a part 130 or workpiece that is flawed, and prevents the additive manufacturing machine 100 from creating the part 130. In alternative examples, where the above described process is performed in a computer independent of the additive manufacturing machine 100, the computer provides an output informing the operator if the input operation(s) will result in a flawed part 130. If the input operation(s) will not result in a flawed workpiece, the operation(s) can then be input in the additive manufacturing machine 100, and the part 130 is created.

By using the defined multi-dimensional space, a technician can generate a part 130, or design a sequence of operations to generate a part 130, without requiring substantial empirical prototyping to be performed. This, in turn, allows the part to be designed faster, and with less expense, due to the substantially reduced number of physical iterations performed.

Figure 2:
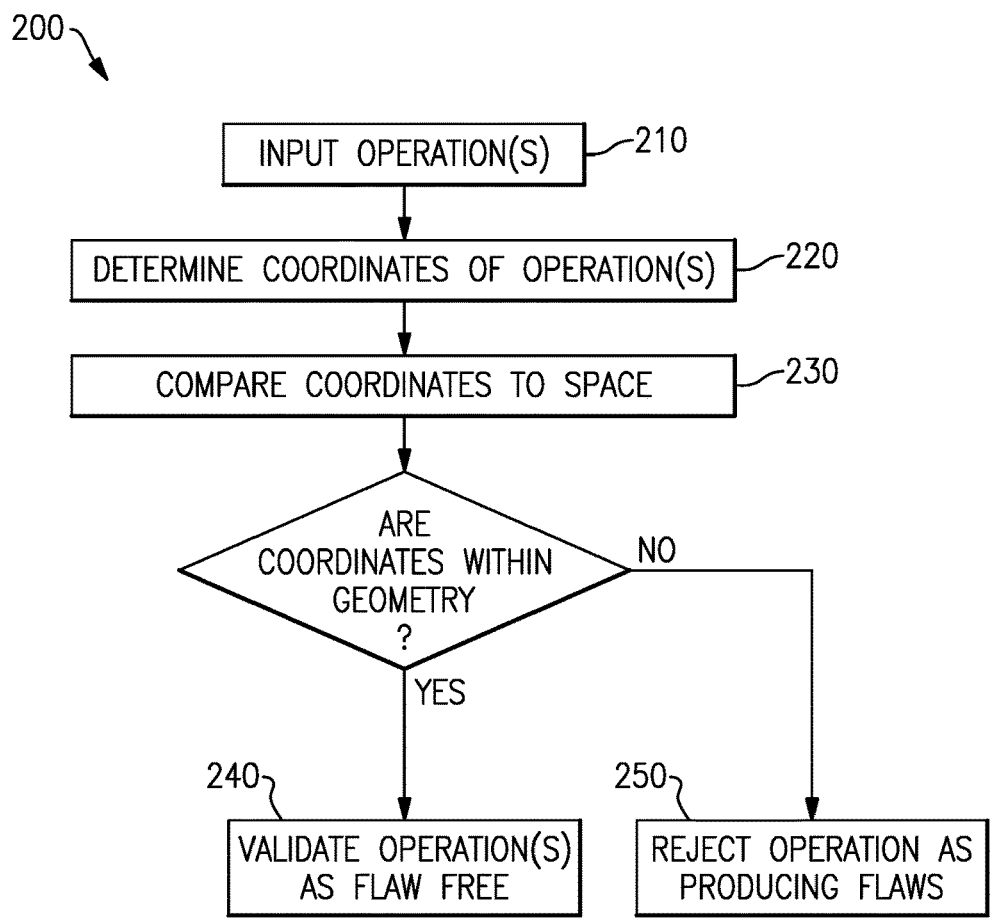
FIG. 2 illustrates an example method for evaluating and validating one or more additive manufacturing operations.

With continued reference to FIG. 1, FIG. 2 illustrates an example method 200 for evaluating and validating a manufacturing sequence of additive manufacturing operations. As described above, initially the technician inputs a desired operation, or sequence of operations, into the computer or the additive manufacturing machine at an "Input Operation(s)" step 210.

The computer/processor then calculates a number of parameters of the input operation(s), and assigns a coordinate in a multi-dimensional coordinate system based on the calculated parameters in a "Determine Coordinates of Operation(s)" step 220. In some examples, the number of parameters, and thus the number of dimensions in the coordinate system, can be in excess of ten. In other examples, the number of parameters can exceed twenty. In an exemplary laser powder bed fusion additive manufacturing process, each of the parameters is determined by a mathematical function dependent on at least a power of a laser used and a scanning velocity of the laser. In alternative additive manufacturing systems, the parameters can be dependent upon other variables, such as a heat source power and a translation speed.

The parameters can include, but are not limited to, beam focus, wire or powder particle diameter, environmental conditions, particle density, or any number of other related parameters. Improper parameters can result in output parts including excessive flaws. The possible flaws impacted by the parameters include, but are not limited to, balling, keyholing, keyhole pore formation, lack of fusion, and unmelt. Alternative additive manufacturing systems can require, or use, alternative or additional parameters to define the multi-dimensional space depending on the specific features of the additive manufacturing system.

In an exemplary laser powder bed fusion process, balling refers to the creation of spherical, or approximately spherical shapes within the structure of the part due to the specific operations. The balling flaw corresponds to an expected amount of balling within the resultant part 130. Similarly, keyholing refers to the the creation of potentially unstable melt pool shapes during the manufacturing process, and the keyholing flaw corresponds to an expected amount of keyholing in the resultant part. Unmelt, refers to residual amounts of unmelted powder material within the part.

While the specifically enumerated parameters are parameters of a laser powder bed fusion additive manufacturing process, one of skill in the art having the benefit of this disclosure will understand that similar parameters related to any given additive manufacturing process could be utilized instead of, or in addition to, the enumerated parameters, and one of skill in the art, having the benefit of this disclosure, would be capable of ascertaining the relevant parameters for an alternative additive manufacturing system.

Once the coordinate of the sequence of operations is determined, the computer/processor compares the coordinate to the predefined space in the multi-dimensional coordinate system in a "Compare Coordinates to Space" step 230. As described above, the pre-defined space is a multi-dimensional space defining bounds along each dimension, with the dimensions corresponding to the parameters. If the determined coordinate of the sequence of operations is within the space, the computer/processor validates the sequence of operations as flaw free in a "Validate Operation(s) as flaw free" step 240. If, however, the coordinate falls outside of the predefined space, the computer/processor rejects the sequence of operation as being flawed, or resulting in a flawed part, in a "Reject Operation as Producing Flaws" step 250.

The rejection of an input sequence as resulting in a flawed part can take the form of the controller of an additive manufacturing system, such as a laser powder bed fusion additive manufacturing system, rejecting the sequence of operations. In alternative examples, where the process is performed on a computer, the rejection of the input sequence of operations as resulting in a flawed part can take the form of a warning, or other prompt, informing the user that the proposed sequence of operations is flawed.

By utilizing the predefined space, a technician can attempt several sequences of operations for making a given part without being required to iterate multiple physical prototypes. One of skill in the art will recognize, however, that the result of an operation may still include unanticipated flaws, or be otherwise unsuitable even if the above process validates it. As such, in some examples, a minimal amount of iteration is still required to develop an acceptable end part. In such an example, each iteration of the sequence of operations is compared to the space and subjected to the evaluation and validation process. Further, the equations defining the bounds of each dimension of the multi-dimensional space can be refined, in light of the new empirical data, between iterations to account for the newly determined flawed coordinate. This refinement can be carried forward and applied to validation of further sequences of operations, or limited to the current input sequence of operations, depending on the nature of the parameter being refined. By way of example, if the parameter being refined is related to powder particle size, the parameter could be applied forward. However, if the parameter is related to the specific environmental conditions, such as an ambient humidity, the parameter would not be universally applicable, and may be limited to the instant validation.

Figure 3:
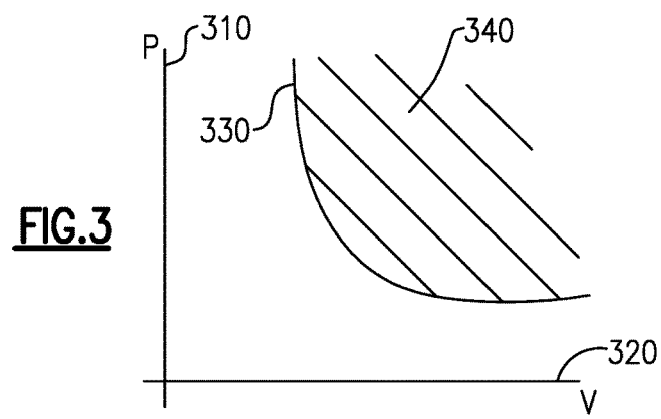
FIG. 3 illustrates an example parameter that defines a multi-dimensional space.
Figure 4:
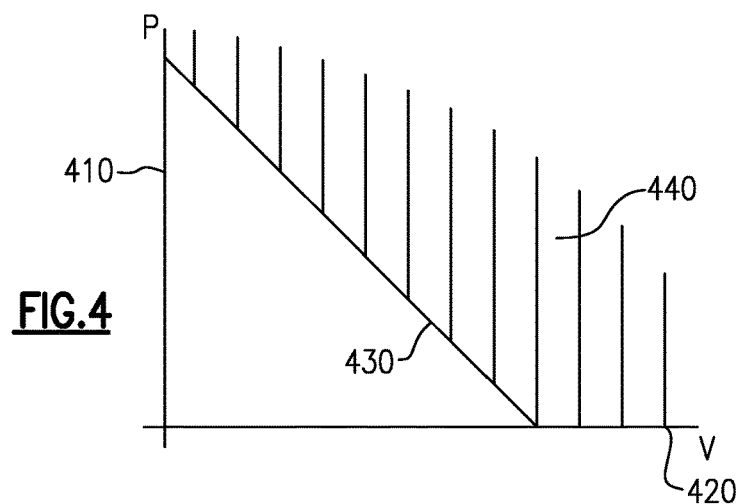
FIG. 4 illustrates another example parameter that defines the multi-dimensional space.
Figure 5:
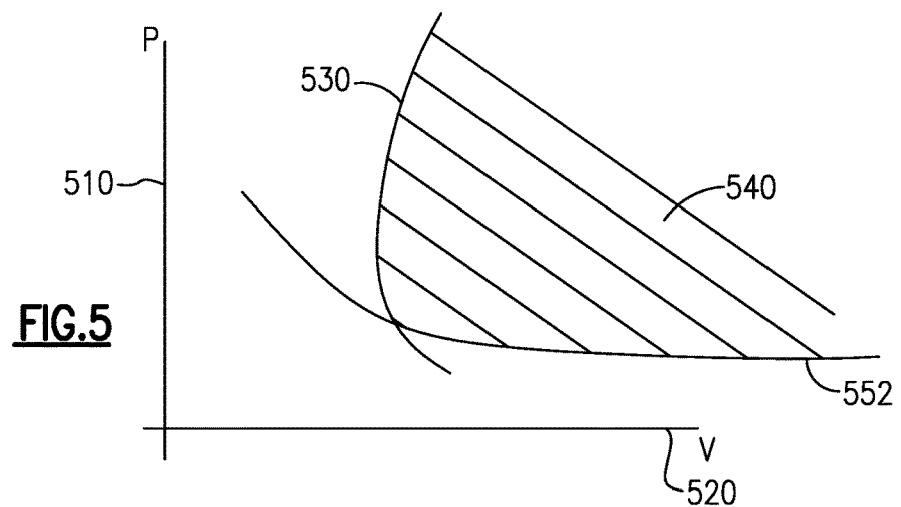
FIG. 5 illustrates another example parameter that defines the multi-dimensional space.
Figure 6:
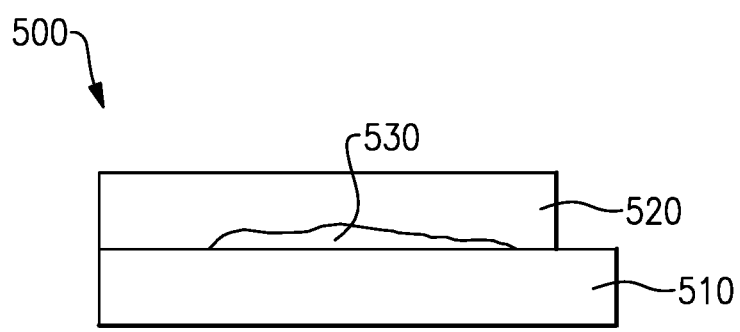
FIG. 6 illustrates one exemplary flaw that can be accounted for using the process and system described herein.

With continued reference to FIGS. 1 and 2 above, FIGS. 3-5 illustrate example parameters that define dimensions and bounds of the multi-dimensional space discussed above. With regards to FIG. 3, a polynomial bound is defined and is dependent upon a beam power (P) and a scanning velocity (V) of a laser in a laser powder bed fusion additive manufacturing system. The example of FIG. 3 defines a bound 330 relative to a beam power (P) axis 310 and a scanning velocity axis (v). In the illustrated bound 330, everything on one side of the bound 330 defines a "flaw free" region 340, whereas everything on the other side of the bound 330 is known to produce unacceptable levels of flaws.

FIG. 4 illustrates a bound 430 that has a linear relationship between a beam power (P) axis 410 and a scanning velocity (V) axis 420. As with the example of FIG. 3, everything on one side the bound 430 is a "flaw free" region 540, while everything on the other side of the bound 430 is known to include unacceptable levels of flaws.

FIG. 5 illustrates a bound defined by two functions 530 and 550, with everything between the two functions 530, 550 being a "flaw free" region 540 and everything not between the two the functions 530, 550 being known to result in unacceptable levels of flaws.

Each of the plots of FIGS. 3-5 corresponds to one parameter, and one dimension of the multi-dimensional space. The specific equations defining the bounds within each parameter can be developed by one of skill in the art, and are dependent on the specific part being constructed, and the corresponding tolerances of that part. The bounds and parameters are further dependent on the additive manufacturing process, the type of additive manufacturing machine being utilized and any number of other factors.

Each of the examples of FIGS. 3, 4 and 5 illustrates a partially unbounded parameter which defines a flaw free region 340, 440, 540. In alternative examples, one or more of the parameters can include multiple bounds, and define an enclosed, finite, flaw free region.

To define the multi-dimensional space discussed above, each of the parameters of FIGS. 3, 4 and 5 are combined in a single coordinate system, with each parameter being a unique dimension. To facilitate the combination, the parameters are normalized to a single scale. The flaw free regions 340, 440, 540 of each parameter defines a space within that dimension that, when combined with the other parameters, forms a multi-dimensional space.

In some examples, the bounds of each parameter are determined empirically, via iterative testing in a laboratory environment. In other examples, the bounds of each parameter are determined via mathematical modeling and simulations, and no iterations or physical tests are required. Even further still, in some embodiments, the bounds of the parameters are developed as a combination of both physical testing and theoretical models with some parameters being based on empirical data and some parameters being determined by theoretical modeling.

One of skill in the art, having the benefit of this disclosure will further understand that the multi-dimensional space can be utilized in the reverse manner to determine appropriate parameters to create a given work piece. In such an example, the parameter coordinates for a given operation are entered into the computer/processor, and the computer/processor reverses the steps to determine an operation, or sequence of operations, that result in the desired parameter coordinates.

In one specific example, the system described above can account for, and prevent, operations that will result in a horizontal lack of fusion flow. A horizontal lack of fusion refers to a component where a first layer of the additively manufactured part is not connected to (alternately referred to as fused to) one of the adjacent layers of the additively manufactured part. As used herein, "horizontal" refers to a horizontal orientation of the workpiece, relative to gravity, as the workpiece is being created.

With continued reference to FIGS. 1-5, FIG. 6 illustrates two layers of a workpiece that includes a horizontal lack of fusion flaw. The workpiece 500 includes a first horizontal layer 510 and a second horizontal layer 520. Due to specific parameters during the manufacturing process, a portion of the top layer 520 is not fused to the bottom layer 510 due to the presence of unmelted material during the manufacturing process. This portion results in a horizontal lack of fusion flaw 530. The flaw, in turn, impacts the stability and structure of the part.

As described above, flaws within a workpiece are the result of a combination of multiple parameters during the creation of the workpiece. The presence of unmelted material between one or more layers 510, 520 is primarily impacted by the power of the beam, the velocity of the beam, a local part temperature, a powder bed thickness, and a powder particle size.

The power of the beam refers to the magnitude of power provided to the beam utilized to melt the particles forming the workpiece, and the velocity of the beam refers to the velocity at which the beam is moved across the powder bed in order to create the specific geometry of the workpiece. The local part temperature is the local temperature within the powder bed during the manufacturing process. The powder bed thickness is the depth of the powder bed during the manufacturing process. The powder particle size is the average size, including tolerances, of the particles within the powder utilized to create the workpiece.

Each of the key parameters is represented as a bound, or multiple bounds defined using a function, or set of functions, as illustrated and described above with regards to FIGS. 3-5. The specific functions can be determined according to known procedures and are specific to a given workpiece.

While a process and system for accounting for horizontal lack of fusion is described herein, one of skill in the art will understand that the process can be applied in conjunction with a system and process for accounting for one or more additional flaws to further refine the operations for running the additive manufacturing process. In some examples, the combination of the horizontal lack of fusion flaw validation and additional flaw validation can be achieved by providing a multidimensional space for each flaw, and iterating the validation process for each space. In alternative examples, the bounds of each parameter for each of the multiple flaws can be merged into a single bound for the given parameter. A multidimensional space is then generated encompassing all of the parameters and the validation process can be run a single time.

It is further understood that any of the above described concepts can be used alone or in combination with any or all of the other above described concepts. Further, one of skill in the art having the benefit of this disclosure will understand that additional enumerated, or non-enumerated, parameters can impact the formation of any or all of the above described flaws. As such, the above described system can be adapted to include additionally identified parameters, and still fall within the present disclosure. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of evaluating and validating additive manufacturing operations comprising:
  generating a multidimensional space defined by a plurality of bounds, each of said bounds being defined on a distinct parameter of an additive manufacturing process and each of said parameters being directly related to the occurrence of a horizontal lack of fusion flaw, each of said parameters being a dimension in a multi-dimensional coordinate system and being defined by at least one corresponding mathematical function, wherein at least one of the at least one corresponding mathematical functions is determined via computer simulation;
  determining a coordinate position of at least one additive manufacturing operation within the multi-dimensional coordinate system; and
  categorizing the operation as free of horizontal lack of fusion flaws when the coordinate position is within the multi-dimensional space.

2. A method of evaluating and validating additive manufacturing operations comprising:
  generating a multidimensional space defined by a plurality of bounds, each of said bounds being defined on a distinct parameter of an additive manufacturing process and each of said parameters being directly related to the occurrence of a horizontal lack of fusion flaw, each of said parameters being a dimension in a multi-dimensional coordinate system and being defined by at least one corresponding mathematical function, wherein at least one of the at least one corresponding mathematical functions is determined via simulation;
  determining a coordinate position of at least one additive manufacturing operation within the multi-dimensional coordinate system;
  categorizing the operation as free of horizontal lack of fusion flaws when the coordinate position is within the multi-dimensional space; and
  wherein at least one of the parameters is partially unbounded.

3. An additive manufacturing apparatus comprising:
  a chamber;
  a platform within said chamber; and
  a controller, the controlling including a processor and a memory, the memory storing instructions for causing the processor to validate at least one input operation as generating a workpiece free of horizontal lack of fusion flaws by determining a multi-dimensional coordinate in response to receiving the at least one input operation, and comparing the multi-dimensional coordinate to a stored multi-dimensional space, the stored multi-dimensional space being defined by a plurality of bounds, each of said bounds being defined on a distinct parameter of an additive manufacturing process, each distinct parameter of the additive manufacturing system being defined by at least one corresponding mathematical function, wherein the parameters of the additive manufacturing process include a beam power, a beam velocity, a local part temperature, a powder bed thickness, and a powder particle size and each of said parameters is directly related to the occurrence of a horizontal lack of fusion flaw, and wherein at least one of the at least one corresponding mathematical functions is determined via simulation and at least one of the parameters is partially unbounded.

4. The additive manufacturing apparatus of claim 3, wherein the chamber further includes a powder bed fusion apparatus.

5. The additive manufacturing apparatus of claim 4, wherein the powder bed fusion apparatus is a laser powder bed fusion apparatus.

6. The additive manufacturing apparatus of claim 4, wherein the powder bed fusion apparatus is an electron beam powder bed fusion apparatus.

7. The additive manufacturing apparatus of claim 3, wherein the memory further stores instructions for rejecting the at least one input operation in response to the determined multi-dimensional coordinate falling outside the multi-dimensional space.

8. The additive manufacturing apparatus of claim 3, wherein the multi-dimensional space is a space having four or more dimensions, and wherein each of said dimensions includes at least one bound corresponding to an operational parameter of an additive manufacturing process.

9. A method of evaluating and validating additive manufacturing operations comprising:
generating a multidimensional space defined by a plurality of bounds, each of said bounds being defined on a distinct parameter of an additive manufacturing process and each of said parameters being directly related to the occurrence of a horizontal lack of fusion flaw, each of said parameters being a dimension in a multi-dimensional coordinate system and at least one of said parameters is partially unbounded;
determining a coordinate position of at least one additive manufacturing operation within the multi-dimensional coordinate system; and
categorizing the operation as free of horizontal lack of fusion flaws when the coordinate position is within the multi-dimensional space.

10. The method of claim 9, wherein an operation that is free of horizontal lack of fusion flaws is an additive manufacturing operation where horizontal lack of fusion flaws in a resultant work piece are below an acceptable threshold.

11. The method of claim 9, wherein the parameters include a beam power, a beam velocity, a local part temperature, a powder bed thickness, and a powder particle size.

12. The method of claim 11, wherein each of said parameters is normalized to each other of said parameters.

13. The method of claim 11, wherein at least one of the mathematical functions is a least partially empirically determined.

14. The method of claim 9, further comprising creating a work piece by causing an additive manufacturing machine to perform the at least one additive manufacturing operation in response to categorizing the at least one additive manufacturing operation as free of horizontal lack of fusion flaws.

15. The method of claim 9, wherein at least one of the parameters is fully bounded.

16. The method of claim 9, wherein the at least one additive manufacturing operation is a sequence of additive manufacturing operations.

17. The method of claim 16, wherein the sequence of additive manufacturing operations is an ordered list of all operations required to create a part.

18. The method of claim 9, wherein generating a multidimensional space defined by a plurality of bounds comprises generating multiple multidimensional spaces defined by a plurality of bounds, each of said multiple multidimensional spaces corresponding to one or more flaws and at least one of said multidimensional spaces corresponding to the horizontal lack of fusion flaw.

* * * * *